(12) United States Patent
Auriol et al.

(10) Patent No.: US 8,732,936 B2
(45) Date of Patent: May 27, 2014

(54) BLIND RIVET AND REMOVAL METHOD THEREOF

(75) Inventors: Pierre Auriol, Flourens (FR); Jean-Marc Auriol, Flourens (FR)

(73) Assignees: Ateliers de la Haute Garonne ets Auriol et Cie, S.A., Balma Cedex (FR); Ateliers de la Haute-Garonne Rivets, S.A., Flourens (FR); Eris, S.A.R.L., Flourens (FR)

( * ) Notice: Subject to any disclaimer, the term of this patent is extended or adjusted under 35 U.S.C. 154(b) by 177 days.

(21) Appl. No.: 13/077,094

(22) Filed: Mar. 31, 2011

(65) Prior Publication Data

US 2011/0194909 A1  Aug. 11, 2011

Related U.S. Application Data

(62) Division of application No. 12/064,662, filed as application No. PCT/FR2006/050761 on Jul. 28, 2006, now abandoned.

(30) Foreign Application Priority Data

Aug. 26, 2005  (FR) ...................................... 05 52574

(51) Int. Cl.
*B21J 15/04*  (2006.01)

(52) U.S. Cl.
USPC .......................................... 29/525.06; 411/43

(58) Field of Classification Search
USPC ............... 29/525.06, 525.05, 812.5, 243.521, 29/243.522, 243.53; 411/43, 39
See application file for complete search history.

(56) References Cited

U.S. PATENT DOCUMENTS

| 3,277,771 A | * | 10/1966 | Reynolds | 411/39 |
| 4,865,499 A | * | 9/1989 | Lacey | 411/34 |
| 4,904,133 A | * | 2/1990 | Wright | 411/43 |
| 5,252,013 A | * | 10/1993 | Browne et al. | 411/43 |
| 5,496,140 A | * | 3/1996 | Gossmann et al. | 411/43 |

* cited by examiner

*Primary Examiner* — Lee D Wilson
*Assistant Examiner* — Steven A Maynard
(74) *Attorney, Agent, or Firm* — Jackson Patent Law Office

(57) ABSTRACT

A method of operating with a rivet is for the coupling and the tack riveting together of a first element and a second element. The method comprises positioning the rivet such that the rivet traverses two substantially coaxial openings arranged in the first and second elements to be assembled; pulling the mandrel to form a bulb on the second end; and resuming pulling of the mandrel, to cause a rupture of the sleeve at the bulb so as to permit removal, by way of the external surface of the first element, of the mandrel and of a first portion of the sleeve as well as the falling away of the portion of the bulb remaining on the external surface of the second element.

7 Claims, 4 Drawing Sheets

BLIND RIVET AND REMOVAL METHOD THEREOF

CROSS-REFERENCE TO RELATED APPLICATION

This Application is a Divisional of U.S. application Ser. No. 12/064,662 (International Patent Application PCT/FR2006/050761) of Pierre AURIOL and Jean-Marc AURIOL filed Jul. 28, 2006 for BLIND RIVET AND REMOVAL METHOD THEREOF, the contents of which are herein incorporated by reference.

FIELD OF THE INVENTION

This invention relates to the field of blind rivet fastenings, specifically to adaptations permitting, under the best conditions, different phases of operations consisting of tack riveting two pieces of sheet between themselves.

DESCRIPTION OF THE PRIOR ART

The phase of operation of temporary fastening known as a tack riveting operation is an assembly phase that presents a plurality of functions:
 the positioning of the elements to be assembled
 the flow of sealing mastic, if mastic is used
 the coupling of the sheets of metal
 and keeping them in position.

The applicants have found that upon completion of the coupling and tightening operation, the blind rivets of the prior art have, within the context of tack riveting, the disadvantage of providing very little installed tension in the tightening they effect which could be especially disadvantageous for the permanent fastening phase of operation that customarily follows the temporary fastening phase of operation.

Another disadvantage likewise linked to the transition between the temporary fastening phase of operation and the permanent fastening phase of operation relates to the removal of the temporary fastening means. In fact, the removal phase of operation should be realizable in a short period of time and as simply as possible. As such, the applicants have found that such phases of operation require specific tools, in particular for the machining of the rivet fitted as a basis for destruction, such machining being likely to damage the elements to be assembled.

A further disadvantage of the fastening means of the prior art used for tack riveting is the lack of adaptability with regard to the thickness of the elements they are intended to assemble. Indeed, the capacities of the fastening means of the prior art do not allow, through the use of one single dimensional model, assembly of the set of possible different thicknesses by tack riveting, which thus requires rivets of a plurality of dimensional models.

EP 0 677 666 discloses a blind rivet of the type intended for the coupling and the tack riveting together of at least two elements, said rivet being positioned by a setting tool,
 the rivet being an assembly comprising a deformable hollow sleeve and a breakable mandrel positioned within said sleeve,
 the assembly being positioned and traversing two substantially coaxial openings and arranged in the elements to be assembled,
 the sleeve comprising a body having two ends,
 a first end comprising a preformed head for defining a first support surface on the external surface of a first element, and a second end which, under the action of a tension deformation on the mandrel, forms a bulb that defines a second support surface on the external surface of said second element,
 the prolongation of the effort causing the two support surfaces to be drawn nearer each other and consequently also drawing nearer together the two elements to be assembled.

In the embodiment illustrated, the sleeve is integrally composed of one and the same piece and is preformed from a single tapered portion positioned between the two support surfaces. Nevertheless, the tension movement contributing to the installation of the rivet disclosed in the document does not concomitantly also crimp the first end of the sleeve onto the second end of the mandrel. It is therefore not possible to create a true tightening load or an installed tension aided by the rivet disclosed in the document since the mandrel is not fixed to the sleeve upon completion of the deformation of said sleeve.

DESCRIPTION OF THE INVENTION

The applicants have undertaken research in view of proposing a blind rivet that is capable of being used within the context of a tack riveting method and in view of improving the tightening tension that said rivet creates between the two pieces of sheet metal it is designed to fasten together.

The research was conducted with the purpose of designing and manufacturing of a rivet adapted to the different thicknesses that the assemblies of coupled and tack riveted elements may have.

Furthermore, the removal phase of the operation has also been considered in the design of this rivet.

The blind rivet is of the type anticipated for the tack riveting of at least two elements between said rivet, and it is also positioned by a setting tool,
 the rivet being composed of a deformable hollow sleeve and a breakable mandrel positioned within said sleeve,
 the assembly being positioned and traversing two substantially coaxial openings and arranged in the elements to be assembled,
 the sleeve comprising two ends, a first end comprising a preformed head for defining a first support surface on the external surface of a first element, and a second end which, under the action of a tension deformation on the mandrel, forms a bulb that defines a second support surface on the external surface of said second element,
 said mandrel comprising two ends, a first end comprising a head that, once the mandrel is positioned within the sleeve, supports the second end of said sleeve so that under the action of a tension effort on the mandrel, the head deforms the second end of the sleeve, and a second end with which is associated a tension means producing an effort on the mandrel while concomitantly keeping the first end of the sleeve in contact with one of the elements,
 the prolongation of the effort causing the two support surfaces to be drawn nearer each other and consequently also drawing nearer together the two elements to be assembled as well as crimping the first end of the sleeve onto the second end of the mandrel.

The rivet according to the invention is noteworthy in that it comprises a sleeve which, integrally composed of one and the same piece, is preformed from a single tapered portion positioned between the two support surfaces, said tapered portion functioning not to oppose the tensile force, but rather to facilitate the deformation of the sleeve and to enable an installed tension.

The function and the technical effects of the tapered portion of the invention are specific. The tapered portion is intended to facilitate the deformation of the sleeve and thus to enable an installed tension or maintained tightening effort. The tightening effort is therefore not lost in the deformation of the tapered portion that is deformable under the action of minimal effort. The installed tension is thus created between the portion of the sleeve that is crimped in the grooves of the mandrel and also leaning on the first element and the bulb created by the second end of the sleeve deformed by the head of the mandrel and leaning on the second piece of sheet metal. This novel sleeve consequently permits a gain in effort during installation of the rivet. The tapered portion thus constitutes an axial compression zone facilitating the axial crushing of a well-specified portion of the sleeve so as to increase the tightening or the fastening. The radial extension or expansion, if it occurs, does not have the desired function in the rivet of the invention.

This characteristic is novel in that rivet developers have heretofore not sought to provide a tension in an assembly for temporary fastening such as tack riveting.

The purpose of this tapered portion is not to create a rupture zone necessitating the management of two pieces for the sleeve but rather to avoid the thickness of the sleeve from hindering the tightening load while also ensuring that the sleeve remains of one and the same integral piece.

The tapered zone anticipated in the sleeve described in EP 0 677 666 serves to be deformed so as to create a bulb or to facilitate the creation thereof while the tapered zone of the invention serves to become an axial compression zone facilitating the axial crushing of a well-specified portion of the sleeve in order to increase the tightening of the fastening. This requirement is not found in EP 0 677 666 owing to the absence of crimping.

According to another particularly advantageous characteristic of the invention, the length of the tapered portion is less than the smallest span separating the external surfaces of the elements to be fastened/coupled, which ensures that the tapered part is always positioned so as to be included between the two external surfaces serving as rivet support surfaces. In defining a limited length for the tapered zone of the sleeve, the effects of the latter are made possible regardless of the thickness of the assembly formed by the two elements.

Moreover, the effects are guaranteed by positioning the tapered portion closer to the first support surface defined by the sleeve. This arrangement ensures a large degree of freedom with regard to the length of the sleeve designed to be deformed, thereby increasing the possibilities of thicknesses to be assembled.

According to another particularly advantageous characteristic of the invention, the tapered portion is separated from the support surface defined by the first end of the sleeve that has a more significant thickness.

Another particularly advantageous characteristic of the invention is that the removal of the rivet of the invention is achieved by the resumption of the tension effort that will ensure a rupture of the sleeve at the level of its bulb so as to permit removal, by way of the fastening openings, of the mandrel and of a first portion of the sleeve and the falling away of the portion of the bulb remaining on the exterior. This characteristic is advantageous in that it can be implemented by the setting tool itself. It likewise makes feasible a method for rivet removal, another object of the invention, wherein the rivet is removed by exerting tension on the mandrel as a basis for rupture of the bulb between the head of the mandrel and the edge of the opening provided on the support surface of the bulb. The removal of the tack-riveting rivet thus does not require a special tool and is not designed such that the elements to be assembled could be damaged.

The fundamental aspects of the invention have been expressed hereinabove in their most elementary form, other details and characteristics will be better understood by referring to the description hereinafter and to the accompanying drawings, by way of a non-limiting example, of an embodiment of a rivet and a method for the removal thereof in conformity with the invention.

DESCRIPTION OF PREFERRED EMBODIMENTS

Figure 1:
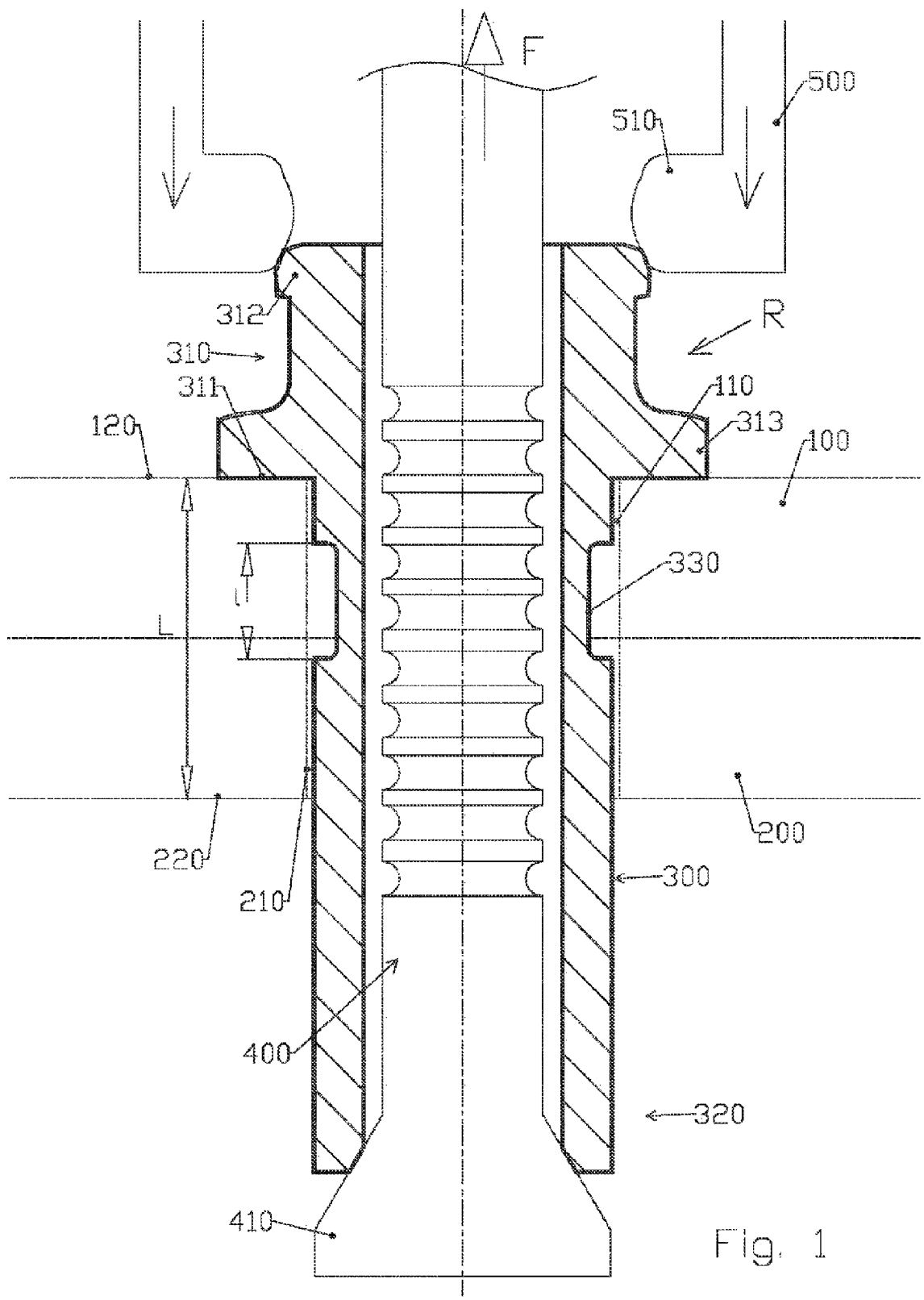
FIG. 1 is a schematic drawing of a cross section of one embodiment of a rivet conforming to the invention.

As illustrated in the drawing of FIG. 1, the blind rivet referenced R is, in its entirety, of a type intended for the coupling and the tack riveting of at least two elements 100 and 200 to one another. The rivet R is an assembly consisting of a deformable sleeve 300 and a breakable mandrel 400. As illustrated, upon positioning, this assembly traverses two openings 110 and 210 rendered substantially coaxial and is arranged in the elements 100 and 200 to be assembled. The sleeve 300 comprises two ends 310 and 320:
 a first end 310 comprising a protruding, preformed head for defining a first support surface 311 on the external surface 120 of a first element 100, and
 a second end 320 that, under the action of a tension deformation symbolized as the arrow F on the mandrel 400, defines a second support surface 321 (illustrated in FIG. 2c) or bulb on the external surface 220 of said second element 200.

As is customary in the context of tack riveting, the prolongation of the effort on the mandrel 400 results in the two support surfaces 311 and 321 to be drawn nearer each other, which consequently also draws nearer together the two elements 100 and 200 to be assembled.

In conformity with the invention, the rivet R comprises a sleeve 300 which, integrally composed of one and the same piece, is preformed from a single tapered portion 330 positioned between the two support surfaces and whose length l is less than the smallest span L separating the external surfaces 120 and 220 of the elements 100 and 200 to be fastened/coupled one to another.

As illustrated, this tapered portion 330 consists of an alteration of the section along a length l of the cylindrical portion of the sleeve 300. In conformity with the invention and as illustrated, the tapered portion 330 consists of a portion of the sleeve 300 having an external diameter less than the external diameter of the remainder of the sleeve 300.

This tapering may, however, take different forms. Thus, according to a non-illustrated example, the tapered portion 330 consists of a portion of the sleeve 300 having an internal diameter greater than the internal diameter of the remainder of the sleeve, with the loss of material then occurring from the internal surface.

Whatever form the tapering may take, it serves to permit the compression of the body of the sleeve 300 between the two support surfaces 311 and 321, said compression arising upon installation of the rivet R in order to prevent the body of the sleeve 300 from having to support the greatest portion of the tensile force and also to decrease the tightening at that position. The axial compression zone therefore can be positioned only between the two support surfaces used for the fastening.

According to another particularly advantageous characteristic of the invention, the sleeve 300 is a series 2000 or 7000 aluminium alloy having a resistance of 60 to 83 ksi (ca. 413 to 571 MPa).

The applicants have established that the thickness of the tapered portion of the sleeve corresponds to approximately 0.5 times the thickness of the sleeve.

The dimensional characteristics of one embodiment of the sleeve are as follows:
thickness of the sleeve: 0.7 millimetres
thickness of the tapered portion: 0.37 millimetres.

According to another particularly advantageous characteristic of the invention, the mandrel 400 is a high-resistance austenitic alloy obtained by work hardening and having a tensile strength of 1500 to 2000 MPa. According to another particularly advantageous characteristic of the invention, the mandrel 400 is a high-resistance austenitic alloy obtained by work hardening and having a tensile strength of 1200 to 2000 MPa.

The combination of the two materials used for the sleeve and for the mandrel, respectively, is instrumental in providing an installed tension. To limit the springback of the stainless austenitic steel, the mandrel may undergo a thermal stabilisation treatment (precipitation hardening).

Moreover, the embodiments envisaged possess a finished quality permitting separate management until the assembly of the mandrels and the sleeves, without the preliminary pre-assembly required of the two elements.

Figure 2:
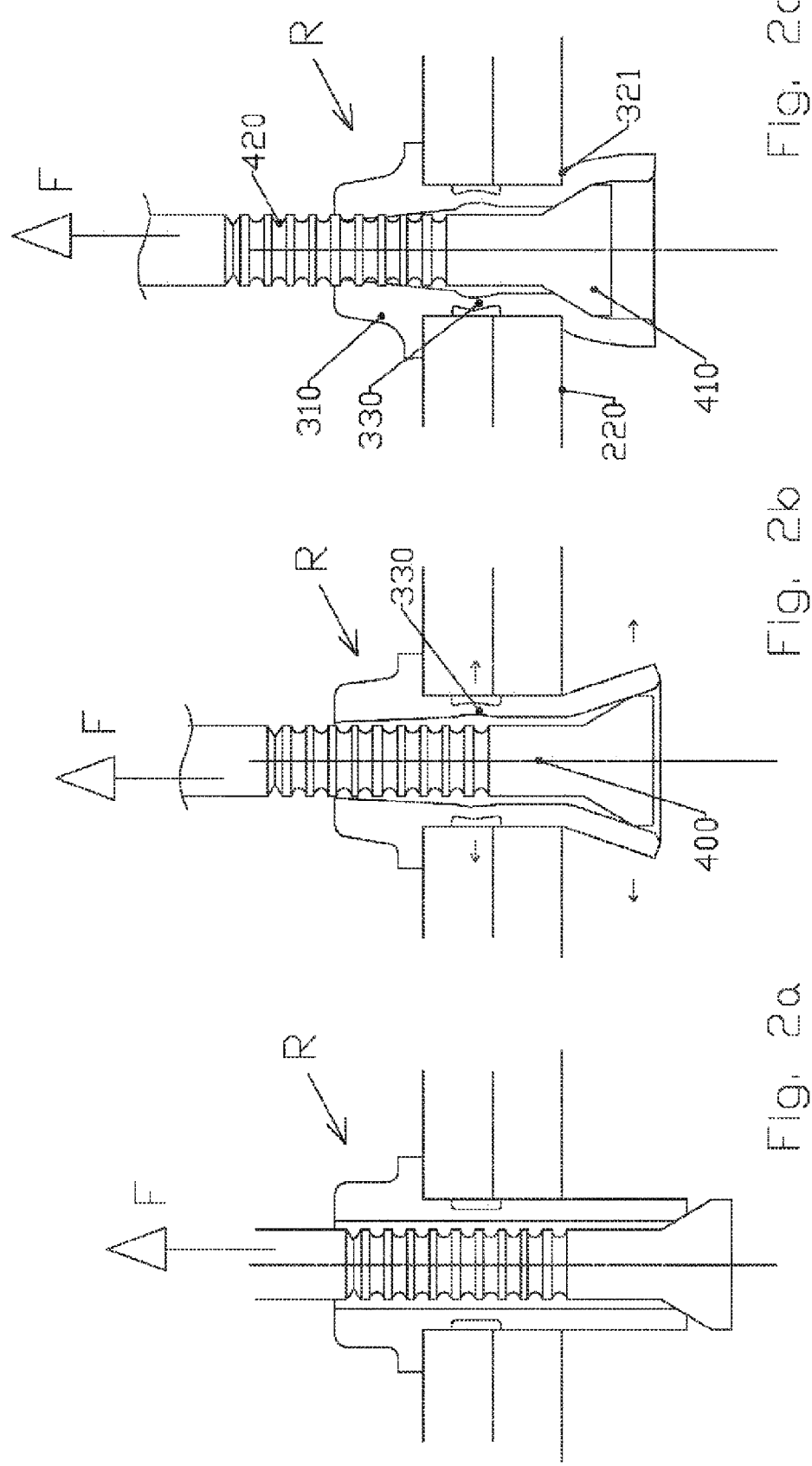
FIGS. 2a, 2b, and 2c are schematic drawings of cross sections illustrating the deformation of the sleeve of the rivet illustrated in FIG. 1.

FIGS. 2a, 2b, and 2c show in cross section the progressive deformation of the sleeve 300 during the installation of the rivet.

In the figures, it clearly appears that under the action of a tensile force symbolized by the arrow F (cf. FIG. 2a), the sleeve 300 deforms at the level of its second end 320, under the action of the mandrel head 410, to form a bulb that then leans on the second element 200 (cf. FIG. 2b). As a consequence of the continuation of the tensile force, the deformation occurs toward the exterior of the sleeve 300 in the tapered portion 330 (cf. FIG. 2c). Said mandrel is advantageously preformed from a plurality of grooves 420 with which the setting tool or removing tool engages.

It is possible to break down the setting sequence in terms of the resultant efforts or forces:
F1: tensile force needed to set the fastening (effort corresponding to the rupture of the neck of the mandrel),
F2: spinning force of the bulb or effort of the creation of the deformed zone, said force/effort enabling the deformation of the sleeve on the blind side,
F3: effort needed to deform the axial compression zone,
F4: effort at the start of the crimping of the sleeve, in which said crimping corresponds to the locking of the sleeve on the positioning-tool side.

The chronology of the setting operations is as follows:
1. Tension on the mandrel;
2. Spinning of the sleeve on the blind side (deformation to create a support surface)
3. Folding of the axial compression zone
4. Crimping of the sleeve
5. Rupture of the mandrel.

The connection between the different efforts/forces is described by the following inequality:

$$F2 < F3 < F4 < F1$$

As illustrated in the drawing of FIG. 1, the form of the head forming the first end 310 of the rivet R has been the object of a study aiming to optimize the deformation phases of the operation and to avoid the setting tool coming into contact with the external surface 120 of the first element 100.

Thus, the head 310 of the sleeve 300 is generally shaped like a hollow cylinder, traversed by the mandrel 400, having a first radial bulge 312 at the level of its upper end as a basis for better cooperation with the setting tool 500, and also having another radial bulge forming a flange 313 at the level of the surface 311 defining the leaning with the element to be assembled as a twofold basis for creating a larger support surface 311 for the head on the element 100 and for creating an obstacle preventing any contact between the setting tool 500 and the surface of said element to be assembled 100.

The shape of the end 500 of the setting tool has been modified to better cooperate with the rivet head. So, as illustrated, the head of the setting tool 500 adopts an opening 510 adopting the internal form of a torus.

Figure 3:
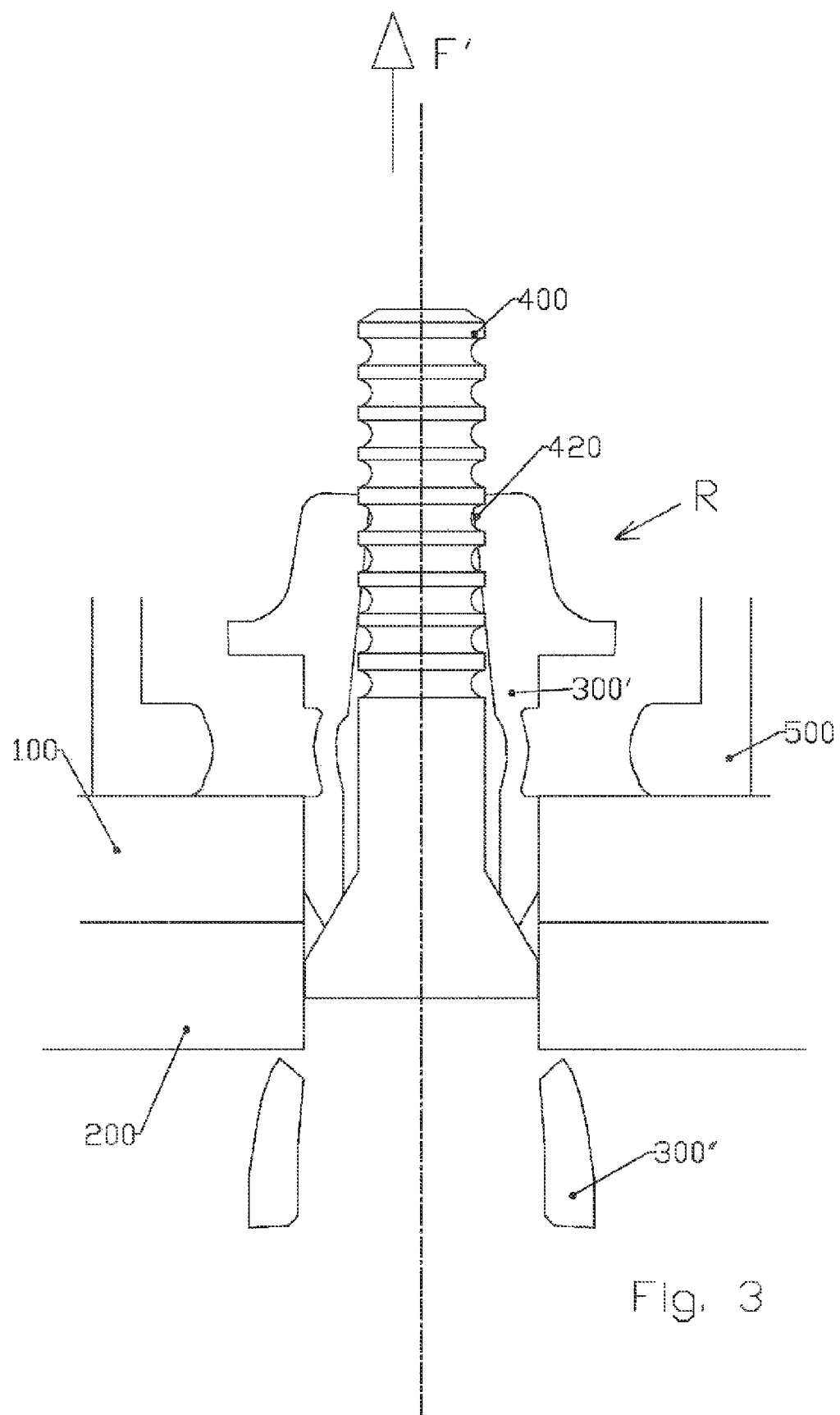
FIG. 3 is a schematic drawing of a cross section illustrating the rupture of the sleeve upon the removal of the rivet.

Another object of the invention consists in the method for removing the rivet R illustrated by FIG. 3. The method, made possible by the geometry and the type of material used for the elements of which the rivet R is comprised, is remarkable because it consists of resuming the tensile force F' which ensures a rupture of the sleeve 300 at the level of its bulb so as to permit removal, by way of the fastening openings 110 and 120, of the mandrel 400 and of a first portion of the sleeve 300' as well as of the falling away of the portion of the bulb remaining on the exterior 300". To achieve this, a particularly advantageous characteristic of the rivet is that said mandrel 400 is preformed from a breakneck groove dimensioned to break and positioned at a sufficient distance from the head of the sleeve 310 in order to permit the recovery of the mandrel 400 on the basis of the removal of the rivet.

As illustrated, even though the positioning tool may be uniform, its end is widened so as to lean upon the element to be assembled and not disturb the extraction of the rivet R.

It is understood that the rivet and the method, which will be described and depicted hereinbelow, are to be regarded from the perspective of a disclosure rather than as of a limitation. Of course, various arrangements, modifications and improvements could be made to the example described hereinabove without, for that matter, going beyond the scope of the invention.

Thus, for example, the preferred embodiment described hereinabove comprises a mandrel composed of a very resistant material that cannot be countersunk. Moreover, to be able to remove said mandrel (i.e. withdraw it) by pulling, the shank of the mandrel must protrude so as to enable it to be re-gripable at the time of removal. The length of the mandrel protrusion varies in accordance with the thickness to be tightened.

In certain applications, particularly for robotics, the protrusion height of the fastening on the setting side must be the same, regardless of the thickness to be tightened. Furthermore, the fastening created by the rivet should be countersinkable.

Figure 4:
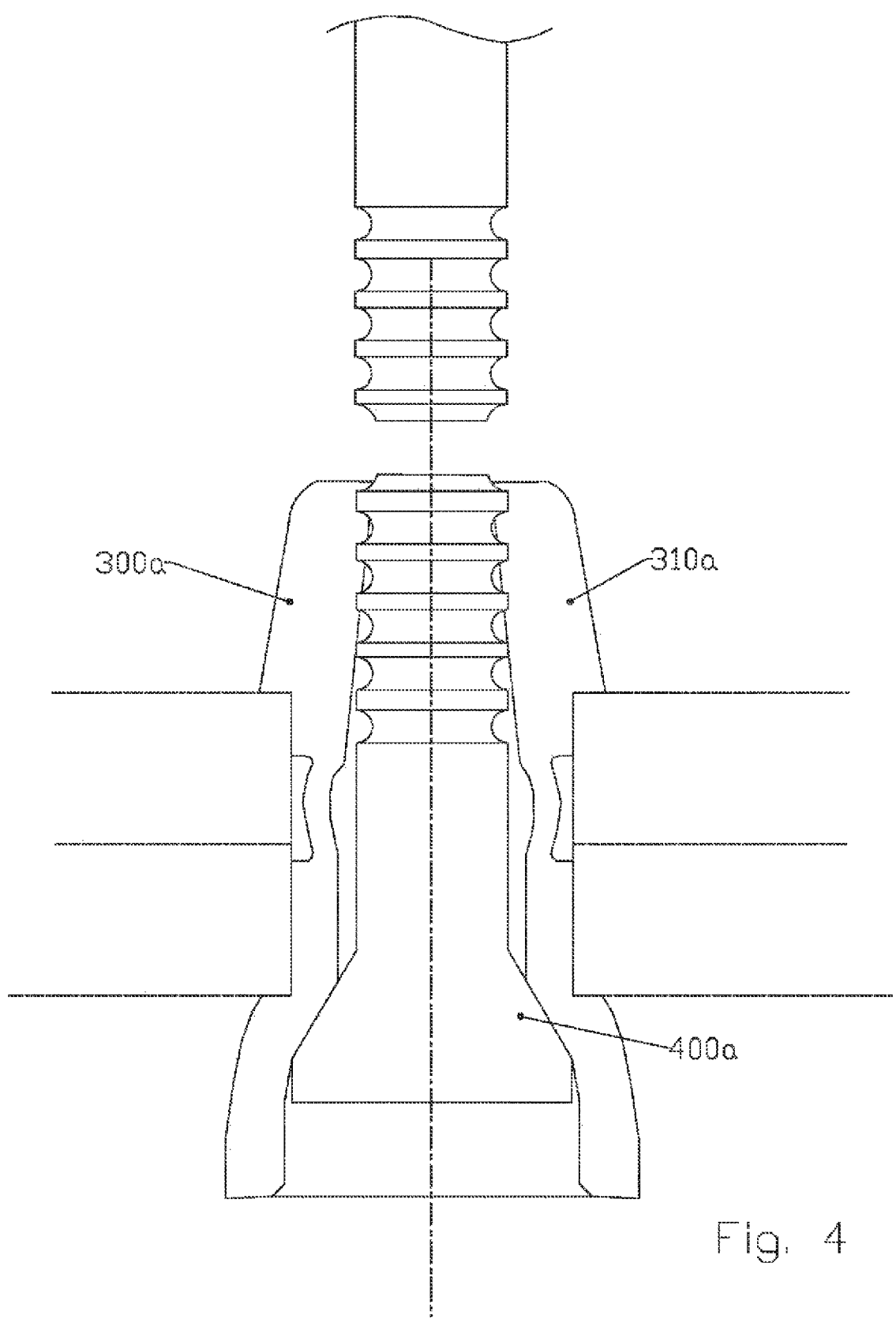
FIG. 4 is a schematic drawing of another embodiment of the rivet of the invention.

To meet this need, one embodiment of the rivet in conformity with the invention has been proposed that consists entirely of aluminium, and, as illustrated in the drawing of FIG. 4, the rivet Ra preserves the structural characteristics established for the rivet according to the invention with regard to the deformed end of the sleeve and the axial compression zone, but modifies the form of the sleeve at the level of the crimping so that the mandrel 400 breaks at the conclusion of insertion at the sweep of the head 310a of the sleeve 300a, regardless of the thickness to be tightened, by means of the accumulation of stresses on that zone.

The invention claimed is:

1. A method of operating with a rivet for the coupling and the tack riveting together of a first element and a second element, the rivet being an assembly comprising a breakable mandrel including a mandrel head, and a deformable hollow sleeve defining a first end and a second end, and the sleeve, being integrally formed of one and the same piece, is preformed from a single tapered portion positioned between the two ends, the tapered portion not interfering with tension forces, while facilitating the deformation of the sleeve and permitting the establishment of an installed tension, the first end comprising a preformed head for defining a first support surface on an external surface of the first element, the breakable mandrel being positioned within the sleeve, the method comprising:

positioning the rivet such that the rivet traverses two substantially coaxial openings arranged in the first and second elements to be assembled;

pulling the mandrel to form a bulb on the second end of the sleeve, the bulb defining a second support surface on an external surface of the second element, to draw the first and second support surfaces nearer each other and consequently draw nearer together the first and second elements, and to crimp the hollow sleeve against the mandrel; and resuming pulling of the mandrel, to cause a rupture of the sleeve at the bulb, removal, by way of the external surface of the first element, of the mandrel head and of a first portion of the sleeve, and detachment of a portion of the bulb from the first portion of the sleeve.

2. A method according to claim 1, wherein the tapered portion includes a portion of the sleeve having an exterior diameter less than the exterior diameter of the remainder of the sleeve.

3. A method according to claim 1 wherein the length of the tapered portion is less than the smallest span separating the external surfaces of the elements to be fastened/coupled.

4. A method according to claim 1 wherein the tapered portion is separated from the support surface defined by the head of the sleeve by a portion having a greater thickness.

5. A method according to claim 1 wherein the head of the sleeve is generally shaped like a hollow cylinder, traversed by the mandrel, having a radial bulge at its upper end as well as at the surface defining the leaning with the element to be assembled.

6. A method according to claim 1 wherein said mandrel is preformed from a plurality of grooves with which the setting tool or removing tool engages.

7. A method according to claim 1 wherein said mandrel is preformed from a breakneck groove dimensioned for breaking and positioned at a sufficient distance from the head of the sleeve in order to permit the recovery of the mandrel on the basis of the removal of the rivet.

* * * * *